April 22, 1924.
W. E. HOKE
PRECISION GAUGE
Filed April 9, 1919
1,491,100
2 Sheets—Sheet 1
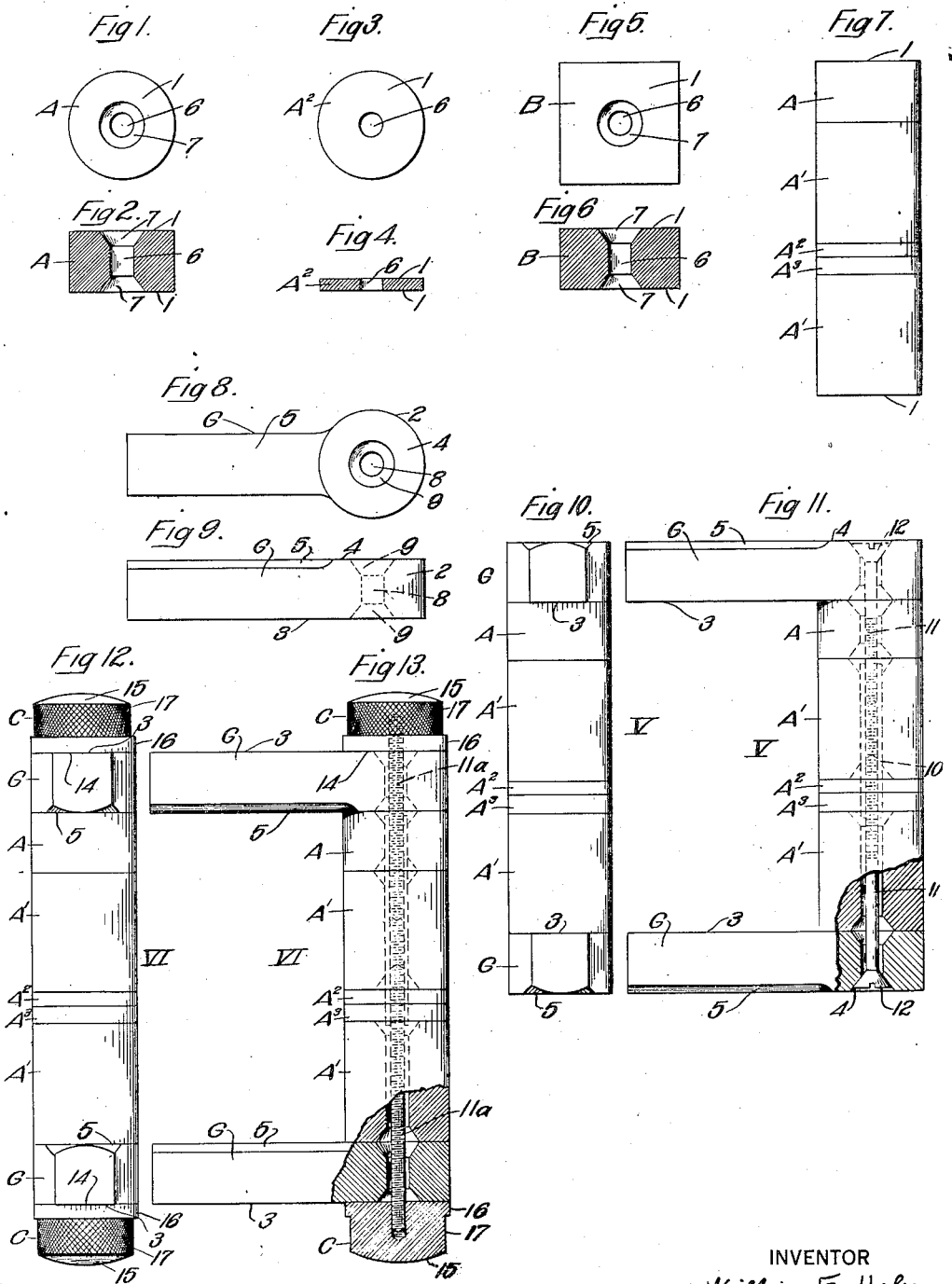
INVENTOR
William E. Hoke
BY S. Jay Teller
ATTORNEY April 22, 1924.
W. E. HOKE
PRECISION GAUGE
Filed April 9, 1919
1,491,100
2 Sheets-Sheet 2
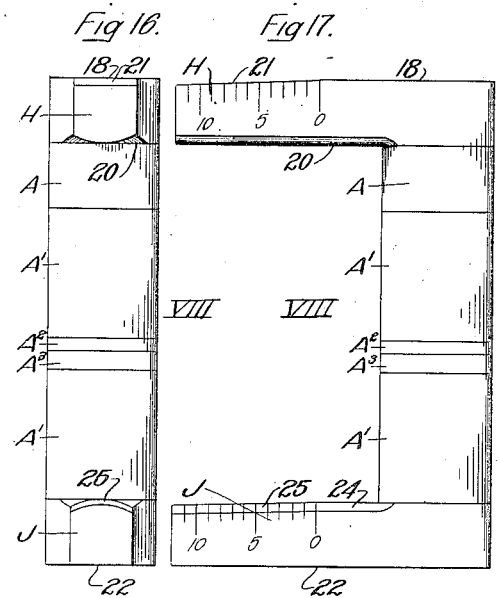
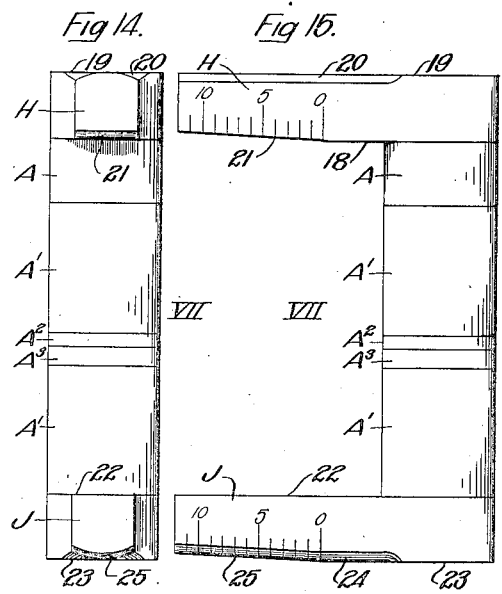
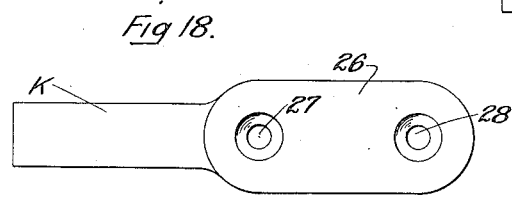
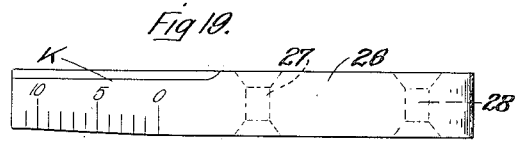
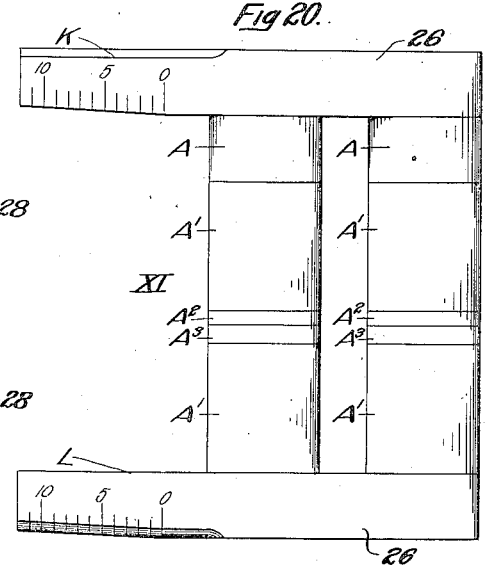
INVENTOR
William E. Hoke
BY S. Jay Teller
ATTORNEY Patented Apr. 22, 1924.

1,491,100

UNITED STATES PATENT OFFICE.

WILLIAM E. HOKE, OF ST. LOUIS, MISSOURI, ASSIGNOR TO PRATT & WHITNEY COMPANY, OF NEW YORK, N. Y., A CORPORATION OF NEW JERSEY.

PRECISION GAUGE.

Application filed April 9, 1919. Serial No. 288,790.

*To all whom it may concern:*

Be it known that I, WILLIAM E. HOKE, a citizen of the United States, residing at St. Louis, Missouri, have invented certain new and useful Improvements in Precision Gauges, of which the following is a specification.

The object of this invention is to provide an improved gauge which includes one or more gauge blocks of predetermined lengths and which can be used as an internal gauge or as an external gauge.

In the accompanying drawings I have illustrated several different gauges embodying the invention but it will be understood that the drawings are intended for illustrative purposes only and are not to be construed as defining or limiting the scope of the invention, the accompanying claims being relied upon for that purpose.

Of the drawings:

Figs. 1 and 2, 3 and 4, and 5 and 6 are end and longitudinal sectional views respectively of different gauge blocks constructed in accordance with the invention.

Fig. 7 is a side view of a series of gauge blocks.

Figs. 8 and 9 are plan and side views respectively of a supplemental gauge element in the form of a gauge bar.

Figs. 10 and 11 are front and side views respectively of a gauge including bars such as shown in Figs. 8 and 9.

Figs. 12 and 13 are front and side views respectively of another gauge including bars such as shown in Figs. 8 and 9, the bars being in a relation opposite to that shown in Figs. 10 and 11.

Figs. 14 and 15 are views similar respectively to Figs. 10 and 11 but illustrating a gauge including different gauge bars.

Figs. 16 and 17 are views similar respectively to Figs. 14 and 15 but showing the gauge bars in reversed relation.

Figs. 18 and 19 are plan and side views respectively of a gauge bar adapted to be used in combination with two series of gauge blocks.

Fig. 20 is a side view of a gauge including bars of the type shown in Figs. 18 and 19.

A gauge embodying the invention preferably consists in part of one or more gauge blocks such as are set forth in my copending application for precision gauges, Serial No. 288,787, filed on even date herewith. In Figs. 1 and 2 I have shown a gauge block A constructed in accordance with the invention. In Figs. 3 and 4 I have shown a block $A^2$ which is similar but much shorter. The blocks A and $A^2$ are circular and this shape is preferred for many purposes. However blocks with other shapes may be provided and in Figs. 5 and 6 I have shown a square block B.

Each block has opposite parallel plane or flat end faces 1, 1 which are at a predetermined distance apart. By means of my improved method and machine, as set forth in my copending application for method of and machine for making gauges and other articles, Serial No. 289,591, filed April 12, 1919, each block may be made without any error greater than one one-millionth of an inch in the flatness of the end faces or in the length between them. Ordinarily the blocks are furnished in sets with assorted lengths, the transverse size and shape of all of the blocks of the set preferably being the same. The lengths of the blocks are either multiples or definite fractions, usually decimal fractions, of a predetermined unit of length. This unit may be the inch, or the centimeter or any other convenient unit of length. If the inch is the unit decided upon, the lengths of the blocks are ordinarily multiples of a thousandth of an inch or multiples of a tenthousandth of an inch. I will herein refer to this predetermined fraction of the standard unit such as the inch as constituting the basic unit upon which the set of blocks is based. When the inch is the standard the basic unit is ordinarily a thousandth of an inch or a ten-thousandth of an inch. For a given set of blocks with lengths in multiples of thousandths the lengths may be so selected as to make it possible, by combining different blocks in wringing contact end to end, to form a series having any desired length measured in inches and thousandths; and, by adding to the set other blocks having lengths in multiples of ten-thousandths it is possible, by combining the blocks, to form a series having any desired length measured in inches and ten-thousandths. Such a series of blocks is illustrated in Fig. 7. The total length of the series is obviously the sum of the total lengths of the individual blocks, A, A¹, A², A³ and A¹. By properly selecting the several blocks any desired total length can be secured.

Figs. 8 and 9 show a supplemental gauge block or bar G. This bar has a boss 2 preferably of the same diameter as the regular blocks. The bar has opposite parallel faces 3 and 4 preferably at a definite predetermined distance apart. Preferably one of the faces, as for instance 3, extends the entire length of the bar. Preferably the other side of the bar is made convex, there being provided a cylindrical face 5 tangent to a continuation of the face 4. Two of the bars G, G can be mounted at the ends of a series of regular gauge blocks to form an external or snap gauge or an internal or plug gauge, or a combined snap and plug gauge such as V, shown in Figs. 10 and 11.

It is well known that several gauge blocks of the type herein shown will adhere to each other, or to other objects having flat surfaces, with considerable force when properly wrung into contact. It is therefore possible, and in many cases preferable, to combine the blocks and other elements and to use them without any special mechanical means for holding them together. I prefer, however, to make it possible to connect the several parts mechanically so that reliance need not be placed solely upon the force resulting from wringing contact. Each element is therefore provided with an abutment preferably located between the opposite gaging faces thereof or at least between the confines of the said gaging faces. This abutment is adapted to be engaged by a suitable connecting means which extends from one element to another. The said connecting means is so constructed and arranged that it holds the several blocks together but nevertheless leaves unobstructed the outer gaging faces of the end blocks or elements or at least leaves unobstructed the major portion of the said faces so that they can contact directly with the parts to be gaged. With the elements thus mechanically connected a strong and rigid gauge is secured which can be handled in the same way as an integral gauge.

Preferably each block is provided with an opening to receive the connecting means, and, as illustrated, the opening in each element is a central hole extending entirely through the element perpendicularly to the end faces. As a connecting means I preferably provide a suitable tie-rod adapted to extend through the holes in the several elements. Preferably the opening or hole in each block or element is utilized to form the abutment which is engaged by the connecting means, this abutment being located, as aforesaid, between the opposite faces. When the opening is a central through hole 6, as illustrated in the drawings, the abutment is formed by countersinking the hole at least at one end as indicated at 7. Preferably the hole is countersunk at both ends to provide opposed abutments, but this is not essential. The boss 2 of each bar G is provided with a hole or opening similar to those in the regular blocks and, as illustrated, it is a central hole 8 which is countersunk, as indicated at 9.

The tie-rod may be varied as to details, but the construction illustrated in Fig. 11 has been found convenient. This consists of a central threaded tube 10 adapted to enter the holes, and two screws 11, 11 entering the tube. In order that there may be no projections beyond the end faces of the outermost elements, the screws 11, 11 may be formed with heads 12, 12 adapted to enter the countersinks in the outermost ends of the outermost elements and to lie below and leave unobstructed the corresponding outermost faces thereof. Ordinarily a number of screws with different lengths are provided so as to accommodate different combinations of blocks. It will be seen that by turning the screws the tie-rod as a whole can be shortened to draw and hold the blocks together. The heads 12 are preferably provided with slots 13 to permit the use of a screw driver.

The distance between the faces 3, 3 of the gauge 5 is determined by the total lengths of the blocks A, A¹, A², A³ and A¹, and the gauge can be used in the usual way for measuring or checking the external dimensions of various pieces. The distance between the faces 4, 4 or 5, 5 is determined by the total of the lengths of the blocks A, A¹, A², A³ and A¹ plus the thicknesses of the two bars G, G. The gauge can be used for measuring or checking internal dimensions, and inasmuch as the faces 5, 5 are convex, the gauge is especially adapted to be used for measuring or checking the diameters of holes.

In Figs. 12 and 13 I have shown a gauge VI somewhat similar to the gauge V but having the gauge blocks G, G arranged in reversed relation. The gauge VI also differs from the gauge V in that screws 11ª, 11ª, threaded at their outer ends are used in lieu of the headed screws 11, 11. The screws 11ª, 11ª are engaged at their ends by suitable nuts, which may be supplemental gauge elements C, C. Each of the blocks is provided with a central hole which is threaded to form an abutment for one of the screws 11ª forming a part of the tie rod. The reversed relation of the gauge bars enables the gauge to be used for special classes of work, as for instance the measuring of the distance between the adjacent edges of two parallel holes.

Each gauge block C has a flat face 14 at one end and a spherical face 15 at the other, the maximum length between the two faces being definite and predetermined, as for instance one-half of the predetermined unit. In the case of a circular block, as shown, there is preferably provided a part 16 adjacent the face 14 which is of the same diameter as the regular blocks, and a part 17 adjacent the face 15 which is of slightly reduced diameter and which is knurled to permit the block to be easily turned. When the end blocks C, C are used, as shown, the same gauge can also be used for measuring or checking larger internal dimensions. The distance between the outer faces 15, 15 of the blocks C, C is obviously the sum of the dimensions of all of the gauge elements.

Figs. 14 and 15 show a gauge VII which is similar to the gauge V but which includes gauge bars H and J differing somewhat from the gauge bars G, G. The bar H is provided with faces 18, 19 and 20 similar respectively to the faces 3, 4 and 5 of the bar G, but adjacent the face 18 there is an inclined flat face 21. The inclination is very slight, that shown in the drawings being greatly exaggerated. At the side of the bar are graduations ranging for instance from 0 to 10. When the regular gauge blocks are made in multiples of a thousandth of the predetermined unit then the amount of inclination from the 0 mark to the 10 mark is a thousandth of the predetermined unit. The gauge bar J is provided with faces 22, 23 and 24 similar respectively to the faces 18, 19 and 20 of the bar G, but adjacent the face 24 there is an inclined convex face 25. The inclination is very slight, that shown in the drawings being greatly exaggerated. At the side of the bar are graduations ranging for instance from 0 to 10. When the regular gauge blocks are made in multiples of a thousandth of the predetermined unit then the amount of inclination from 0 to the 10 mark is a thousandth of the predetermined unit.

When the bars H and J are used as part of a gauge such as VII, they make it possible for measurements to be made to ten-thousanths of the predetermined unit even though the regular blocks are made only in multiples of a thousandth. When used as an external or snap gauge, the bars are passed over the work until contact is effected. The distance between the face 18 and 22 is the total of the lengths of the several regular blocks, this distance being a multiple of a thousandth of the predetermined unit. Inasmuch as the amount of inclination of the face 21 of the bar H is a thousandth each of the ten divisions of the scale represents a ten-thousandth. The size of the work being gaged can therefore be determined by noting the point along the scale of the bar H at which contact is reached. The total length of the blocks plus the scale reading is the desired dimension. When the gauge is used as an internal or plug gauge, the method is similar. The bars are entered in a hole or between surfaces to be gaged until contact is effected. Readings are taken from the scale on the bar J.

Figs. 16 and 17 show a gauge VIII which is similar to the gauge VII except that the gauge bars H and J are placed in reverse relation. The manner of using this gauge will be obvious from the description which has heretofore been given in connection with the gauges VI and VII.

Figs. 18 and 19 show a gauge bar K which is adapted to be used in conjunction with two series of regular blocks. The bar has an elongated boss 26 provided with two spaced holes 27 and 28 therein. The bar K is shown as being otherwise similar to the bar H, but it will be understood that there can be variation from the construction shown.

Fig. 20 shows a gauge IX including a bar K and a bar L similar to the bar K as concerns the elongated boss at otherwise like the bar J. The gauge IX includes two series of regular gauge blocks, the blocks of the two series being selected so as to have the same total length. The gauge IX has the advantage of greater rigidity, but it is otherwise similar to the gauges heretofore described.

What I claim is:

1. An elongated and relatively narrow reversible gauge bar provided with opposite gaging faces in predetermined precise relationship to each other, at least one end of each of the said faces being flat so that the said bar may have face to face wringing or surface contact at either face with a gauge block having a similar flat face, the said bar also being provided near the said end with oppositely facing abutments located between the confines of the said opposite faces, whereby the bar may be connected in face to face contact at either face with a gauge block such as that aforesaid by suitable connecting means engaging the corresponding abutment and positioned to leave unobstructed the gaging face of the bar opposite the said engaged flat face.

2. An elongated and relatively narrow gauge bar provided with opposite gaging faces at a predetermined precise distance apart, one face being flat so that the said bar may have face to face wringing or surface contact with a gauge block having a similar flat face and the other face being of convex cylindrical form with the axis extending longitudinally of the bar, the said bar also having near one end an opening therein the wall of which provides an abutment located between the confines of the said opposite faces, whereby the bar may be connected in face to face contact with a gauge block such as that aforesaid by suitable connecting means extending into the opening and engaging the abutment and positioned to leave unobstructed the gaging face of the bar opposite the said engaged flat face.

3. An elongated and relatively narrow reversible gauge bar provided with opposite gaging faces which at one end are parallel and flat so that the said bar may have face to face wringing or surface contact with a gauge block having a similar flat face and which throughout the remainder of the length of the bar are respectively flat and of convex cylindrical form with the axis extending longitudinally of the bar, the said bar also having near the first said end an opening therein the wall of which provides oppositely facing abutments, whereby the bar may be connected in face to face contact at either face with a gauge block such as that aforesaid by suitable connecting means extending into the opening and engaging the corresponding abutment.

4. A gauge bar comprising a boss and a narrower projection extending therefrom, the said projection being provided with opposite respectively flat and cylindrical gaging faces at a predetermined precise distance apart, and the said boss being provided with opposite parallel flat faces at the same predetermined distance apart so that the said boss may have face to face wringing or surface contact with a gauge block having a similar flat face, the said boss also having at the center thereof a through hole therein extending from one face to the other and countersunk to provide an abutment located between the said faces, whereby the said boss may be connected in face to face contact with a gauge block such as that aforesaid by a tie rod extending through the hole and having a head engaging the countersunk abutment and positioned to leave unobstructed the gaging face of the boss opposite the said engaged flat face.

5. An elongated and relatively narrow reversible gauge bar provided with opposite gaging faces which at one end are parallel and flat so that the said bar may have face to face wringing or surface contact with a gauge block having a similar flat face, and one of which throughout the remainder of the length of the bar is slightly inclined with respect to the opposite face, the said bar also being graduated adjacent the inclined face.

6. An elongated and relatively narrow reversible gauge bar provided with opposite gaging faces which at one end are parallel and flat so that the said bar may have face to face wringing or surface contact with a gauge block having a similar flat face and which throughout the remainder of the the length of the bar are respectively flat and of cylindrical form with the axis extending longitudinally of the bar, the last said part of one of the faces being slightly inclined with respect to the opposite face and the said bar also being graduated adjacent the inclined face.

7. An elongated and relatively narrow reversible gauge bar provided with opposite gaging faces which at one end are parallel and flat so that the said bar may have face to face wringing or surface contact with a gauge block having a similar flat face and one of which throughout the remainder of the length of the bar is slightly inclined with respect to the opposite face, the said bar being graduated adjacent the inclined face and also having near the before mentioned end an opening therein the wall of which provides an abutment, whereby the bar may be connected in face to face contact with a gauge block such as that aforesaid by suitable connecting means extending into the opening and engaging the corresponding abutment.

8. An elongated and relatively narrow reversible gauge bar provided with opposite gaging faces which at one end are parallel and flat so that the said bar may have face to face wringing or surface contact with a gauge block having a similar flat face and one of which throughout the remainder of the length of the bar is slightly inclined with respect to the opposite face, the said bar being graduated adjacent the inclined face and also having near the before mentioned end a through hole therein extending from one face to the other and countersunk to provide an abutment, whereby the bar may be connected in face to face contact with a gauge block such as that aforesaid by a tie rod extending through the hole and having a head engaging the countersunk abutment and positioned to leave unobstructed the gaging face of the bar opposite the said engaged flat face.

9. A gauge comprising in combination one or more gauge blocks each provided with opposite parallel flat faces at a predetermined distance apart, two elongated and relatively narrow end gauge bars provided with opposite gaging faces in predetermined precise relationship to each other, at least one of the faces being flat, each bar also being provided near one end with an abutment located between the confines of the said opposite gaging faces, all of the said blocks and bars respectively having face to face wringing or surface contact with each other, and connecting means engaging the said abutments and serving to connect all of the blocks and bars together with their respectively adjacent flat faces in contact as aforesaid, the said connecting means being positioned to leave unobstructed the outer gaging faces of the said bars.

10. A gauge comprising in combination one or more gauge blocks each provided with opposite parallel flat faces at a predetermined distance apart and each having a through hole therein extending from one face to the other, two elongated and relatively narrow end gauge bars provided with opposite gaging faces in predetermined precise relationship to each other, at least one of the faces being flat, each bar also having near one end a through hole therein extending from one face to the other and countersunk to provide an abutment between the said faces, all of the said blocks and bars respectively having face to face wringing or surface contact with each other, and a tie rod extending into the holes in the blocks and bars and having heads engaging the countersunk abutments and serving to connect all of the blocks and bars together with their respectively adjacent flat faces in contact as aforesaid.

11. A gauge comprising in combination two similar groups of gauge blocks of one or more blocks each, each block being provided with opposite parallel flat faces at a predetermined distance apart and each having a through hole therein extending from one face to the other, two elongated and relatively narrow end gauge bars provided with opposite gaging faces in predetermined precise relationship to each other, at least one of the faces being flat, each bar also having two parallel holes therein perpendicular to the flat face, all of the said blocks and bars respectively having face to face wringing or surface contact with each other, and two tie rods extending respectively into the holes in the blocks of the two groups and in the bars and serving to connect all of the blocks and bars together with their respectively adjacent flat faces in contact as aforesaid.

12. A gauge comprising in combination one or more gauge blocks each provided with opposite parallel flat faces at a predetermined precise distance apart, and gauge bars connected with the ends of the block or blocks and extending perpendicularly therefrom thus forming a snap gauge, each bar being inclined at one side and graduated.

13. A gauge comprising in combination one or more gauge blocks each provided with opposite parallel flat faces at a predetermined precise distance apart, and gauge bars of predetermined thicknesses connected with the ends of the block or blocks and extending perpendicularly therefrom thus forming a snap or plug gauge, each bar being inclined at one side and graduated.

14. A gauge comprising in combination one or more gauge blocks each provided with opposite parallel flat faces at a predetermined precise distance apart, and gauge bars of predetermined precise thicknesses connected with the ends of the block or blocks and extending perpendicularly therefrom, thus forming a snap or plug gauge, each bar being inclined at one side and graduated and each bar also being reversible.

15. A set of gauge blocks each having opposite parallel flat end faces, the several blocks being of similar cross sectional shape but having differing lengths in multiples of a predetermined basic unit, so that by selecting the proper blocks or by combining different blocks of the set any desired multiple of the basic unit may be obtained up to the capacity of the set, in combination with two elongated and relatively narrow gauge bars each provided with a face which is flat at least at one end and adapted to engage the end face of a block, one of the bars having a part of one of its faces inclined with respect to the aforesaid end part and the bar being graduated adjacent the inclined part of the face, the inclination being so related to the graduations that each of the latter represents a known fraction of the aforesaid basic unit.

16. A set of gauge blocks each having opposite parallel flat end faces, the several blocks being of similar cross sectional shape but having differing lengths in multiples of a predetermined basic unit, so that by selecting the proper blocks or by combining different blocks of the set any desired multiple of the basic unit may be obtained up to the capacity of the set, in combination with two elongated and relatively narrow gauge bars each provided with a face which is flat at least at one end and adapted to engage the end face of a block, one of the bars having both of its faces flat and parallel at the said end so that it is reversible and also having a part of one of its faces inclined with respect to the aforesaid end part and the bar being graduated adjacent the inclined part of the face, the inclination being so related to the graduations that each of the latter represents a known fraction of the aforesaid basic unit.

17. A gauge comprising in combination one or more gauge blocks having lengths in multiples of a predetermined basic unit and each having opposite parallel flat end faces, and two elongated and relatively narrow gauge bars each provided with a face which is flat at least at one end and adapted to engage the end face of a block, one of the bars having a part of one of its faces inclined with respect to the aforesaid end part and the bar being graduated adjacent the inclined part of the face, the inclination being so related to the graduations that each of the latter represents a known fraction of the aforesaid basic unit, all of the said blocks and bars respectively having face to face wringing contact with each other.

18. A gauge comprising in combination one or more gauge blocks having lengths in multiples of a predetermined basic unit and each having opposite parallel flat end faces, two elongated and relatively narrow gauge bars each provided with a face which is flat at least at one end and adapted to engage the end face of a block, one of the bars having a part of one of its faces inclined with respect to the aforesaid end part and the bar being graduated adjacent the inclined part of the face, the inclination being so related to the graduations that each of the latter represents a known fraction of the aforesaid basic unit, all of the said blocks and bars respectively having face to face wringing or surface contact with each other, and means for connecting the blocks and bars together.

19. A gauge comprising in combination one or more gauge blocks having lengths in multiples of a predetermined basic unit and each having opposite parallel flat end faces and having a through hole therein extending from one face to the other, two elongated and relatively narrow gauge bars each provided with a face which is flat at least at one end and adapted to engage the end face of a block and each having a hole therein perpendicular to the flat face, one of the bars having a part of one of its faces inclined with respect to the aforesaid end part and the bar being graduated adjacent the inclined part of the face, the inclination being so related to the graduations that each of the latter represents a known fraction of the aforesaid basic unit, all of the said blocks and bars respectively having face to face wringing or surface contact with each other, and a tie rod extending into the said holes and serving to connect the blocks and bars together.

20. A gauge comprising in combination one or more gauge blocks each provided with opposite parallel flat faces at a predetermined distance apart, which precise distance is a multiple of a decimal division of a predetermined unit of length, and gauge bars connected with the ends of the block or blocks and extending perpendicularly therefrom, thus forming a snap gauge, each bar being inclined at one side and graduated to indicate multiples of the next smaller decimal division.

21. A set of gauge blocks each having opposite parallel flat end faces, the several blocks being of similar cross sectional shape but having differing lengths in multiples of a predetermined basic unit, so that by selecting the proper blocks or by combining different blocks of the set any desired multiple of the basic unit may be obtained up to the capacity of the set, in combination with two elongated and relatively narrow gauge bars each provided with a face which is flat at least at one end and adapted to engage the end face of a block, one of the bars having a part of one of its faces inclined with respect to the aforesaid end part and the bar being graduated adjacent the inclined part of the face, the inclination being so related to the graduations that each of the latter represents a known fraction of the aforesaid basic unit, and one of the bars having a part of one of its faces of cylindrical form with its axis extending longitudinally of the bar.

22. A gauge comprising in combination one or more gauge blocks each provided with opposite parallel flat faces at a predetermined precise distance apart, and gauge bars of predetermined precise thicknesses connected with the ends of the block or blocks and extending perpendicularly therefrom, thus forming a snap or plug gauge, each bar having one face convex to permit engagement with concave surfaces and each bar being reversible and the flat face of one bar and the convex face of the other bar being inclined with graduations adjacent the inclined faces.

23. A gauge comprising in combination one or more gauge blocks each provided with opposite parallel flat faces at a predetermined precise distance apart, two special end blocks each provided with one flat face and with a convex face at the side opposite said flat face also provided with an abutment located between the confines of the said opposite faces, all of the said blocks respectively having face to face wringing or surface contact with each other, and connecting means engaging the said abutments and serving to connect all of the blocks together with their respectively adjacent flat faces in contact as aforesaid, the said connecting means being positioned to leave unobstructed the outer gaging faces of the said end blocks.

24. A gauge comprising in combination one or more gauge blocks each provided with opposite parallel flat faces at a predetermined precise distance apart and each having a hole therethrough extending from one face to the other, two elongated and relatively narrow end gauge bars each provided with opposite gaging faces, at least one of the faces being flat and the face at the opposite side being of cylindrical form with the axis extending longitudinally of the bar, each bar also having a hole therein near one end perpendicular to the flat face, all of the said blocks and bars respectively having face to face wringing or surface contact with each other, and a tie rod extending into the said holes and serving to connect all of the blocks and bars together with their respectively adjacent flat faces in contact as aforesaid.

25. A gauge comprising in combination one or more gauge blocks each provided with opposite parallel flat faces at a predetermined precise distance apart, two elongated and relatively narrow end gauge bars each provided with opposite gaging faces in predetermined precise relationship to each other, at least one of the faces being flat and the face at the opposite side being of cylindrical form with the axis of the cylinder extending longitudinally of the bar, each bar also being provided near one end with an abutment located between the confines of the said opposite gaging faces, all of the said blocks and bars respectively having face to face wringing or surface contact with each other, and connecting means engaging the said abutments and serving to connect all of the blocks and bars together with their respectively adjacent flat faces in contact as aforesaid, the said connecting means being positioned to leave unobstructed the outer gaging faces of the said bars.

In testimony whereof, I hereto affix my signature.

WILLIAM E. HOKE.